US005368810A

United States Patent [19]

Draper et al.

[11] Patent Number: 5,368,810

[45] Date of Patent: Nov. 29, 1994

[54] METHOD OF MANUFACTURING A FLUID DISPENSER

[75] Inventors: Ronald A. Draper; James L. Sandonato, both of Braintree, Mass.

[73] Assignee: The Gillette Company, Boston, Mass.

[21] Appl. No.: 662,484

[22] Filed: Feb. 28, 1991

Related U.S. Application Data

[62] Division of Ser. No. 529,184, May 25, 1990, abandoned.

[51] Int. Cl.[5] .............................................. B29C 49/00

[52] U.S. Cl. ............................ 264/523; 264/DIG. 33

[58] Field of Search ....... 264/523, 540, 535, DIG. 33; 425/525

[56] References Cited

U.S. PATENT DOCUMENTS

| | | | |
|---|---|---|---|
| 2,587,382 | 2/1952 | Pyne | 15/136 |
| 3,029,468 | 4/1962 | Valyi | 425/525 |
| 3,197,532 | 7/1965 | Maass | 264/540 |
| 3,608,268 | 9/1971 | Lauritzen | 264/540 |
| 4,221,492 | 9/1980 | Boscardin et al. | 401/184 |
| 4,812,071 | 3/1989 | Batra | 401/264 |

FOREIGN PATENT DOCUMENTS

| | | | |
|---|---|---|---|
| 1160511 | 11/1956 | France | 401/186 |
| 1282995 | 2/1961 | France . | |

OTHER PUBLICATIONS

Advertisement, DeWitt Plastics, Plastics Engineering, Feb. 1962, p. 165.

Advertisement, Jomar, Modern Plastics Encyclopedia, Oct. 1984 p. 193.

Advertisement, Hayssen Manufacturing, Modern Plastics Encyclopedia, Oct. 1984 p. 189.

*Primary Examiner*—Catherine Timm

*Attorney, Agent, or Firm*—Owen J. Meegan; Aubrey C. Brine; Donal B. Tobin

[57] ABSTRACT

A method of manufacturing a dispenser for depositing a liquid material onto a print medium wherein a circular tube having a substantially uniform wall thickness is formed of moldable plastic material. The tube is placed in a mold cavity having a portion for receiving the tube in interfitting engagement and an enlarged cavity portion extending outwardly from the wall of the tube. Pressure is applied to the internal walls of the tube with the tube in plastic flow condition to expand the tube walls into the cavity forming a bulbous portion having a wall thickness less than the tube uniform wall thickness to provide a squeezable portion of greater flexibility than the remainder of the dispenser body.

3 Claims, 2 Drawing Sheets

FIG. 1
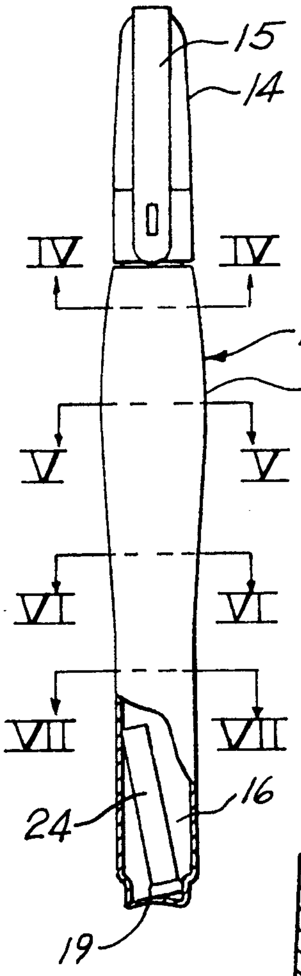
FIG. 2
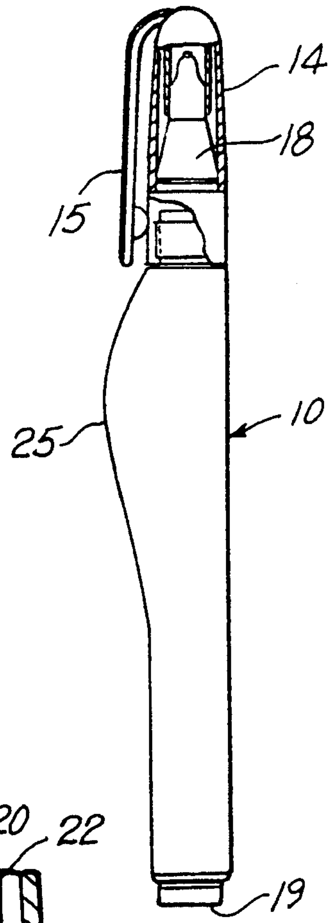
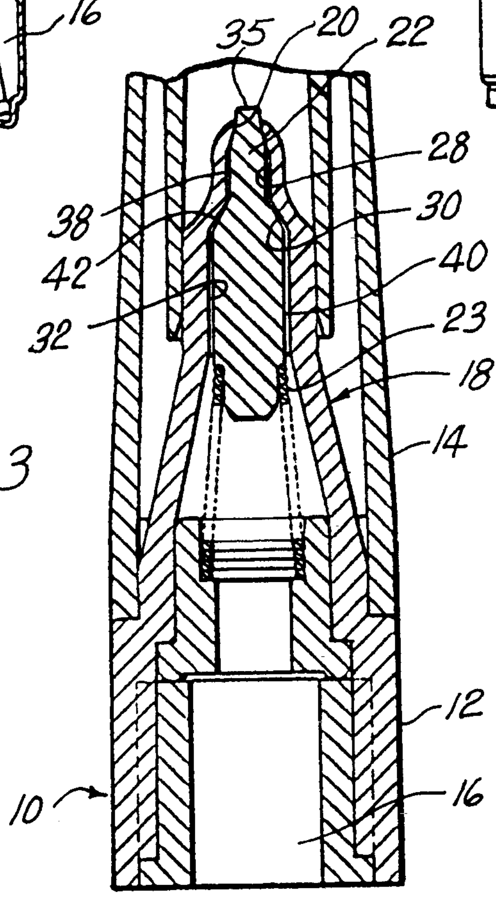
FIG. 3

METHOD OF MANUFACTURING A FLUID DISPENSER

This is a divisional of copending application(s) Ser. No. 07/529,184 filed on May 25, 1990 now abandoned.

BACKGROUND OF THE INVENTION

The present invention relates to a fluid dispenser, and more particularly to a pen style correction fluid dispenser for application of a correction fluid to a print medium to make small to medium size corrections of, for example, typed and pen written documents.

With the increased use of correction fluids in preparing typed or pen written documents for example, various applicators and dispensers may be found in the marketplace, all of which have met with success, from the brush type to the more recent pen type applicators. Generally, the correction fluids used in these devices employ a halogenated hydrocarbon as a solvent. In the pen type or enclosed correction fluid dispensers, these solvents have a vapor phase which is present in the head space of the dispenser and these vapors exert a pressure equal to the vapor pressure of the solvent. The pressure in the head space is also effected by the ambient temperature, and as the temperature increases, the pressure in a fixed volume is directly proportional to the temperature increase.

Additionally, the specific gravity of the correction fluid is inversely effected by the temperature and as the temperature increases, the specific gravity decreases. Therefore, as the temperature increases, the volume occupied by the fluid increases and the head space decreases, causing pressure in the head space to increase. Therefore, when a valve or other release device is open to make a correction, and the head space pressure exceeds the ambient pressure, correction fluid can be driven out of the dispensing valve in volumes large enough to cause an unacceptable correction.

It is therefore an object of the present invention to provide a pen type correction fluid dispenser which is less effected by the differences in ambient and internal pressures than those dispensers of the prior art.

A further object of the invention is to provide a correction fluid dispenser of the type described above which provides the user control of the amount of fluid dispensed with a minimum of effort and with reliability.

Still another object of the invention is to provide a correction fluid dispenser of the pen type which is simple to manufacture and which contains a minimum number of parts.

SUMMARY OF THE INVENTION

The aforementioned objects and other objectives which will become apparent as the description proceeds are accomplished by providing a dispenser for depositing a liquid material onto a print medium comprising wall structure forming an elongated tubular body for retaining the liquid material therein. A sealing means is disposed at the rearward end of the tubular body for retaining the liquid material therein, and valve means is disposed at the forward end of the body for controlling release of the fluid from the tubular body. The tubular body is substantially circular in cross-section at the rearward end and the forward end and has at least one enlarged body portion therebetween formed of greater cross-section than either the rearward or forward end cross-sections. The valve and tubular body are dimensioned such that pressure exerted on the enlarged body portion is effective to force a liquid material from the tubular body when the valve is in the open position.

The elongated tubular body is generally a wall structure of substantially uniform wall thickness at the rearward end and the forward end, and of a variable thickness over the length of the enlarged body portion to provide a flexible wall at the enlarged body portion and a more rigid wall at the ends of the dispenser. That is, the elongated tubular body wall structure may be formed of a minimal wall thickness within the length of the enlarged body portion to provide a squeezable area allowing the user to force the material from the dispenser in a controlled manner. The enlarged body portion may also be disposed adjacent the forward end of the tubular body, and is generally of oval cross-section.

The valve means of the dispenser generally comprises a plurality of interior wall surfaces of the tubular body which terminate in an opening at the forward end of the body. The wall surfaces may be formed on a separate portion of the tubular body which is sealed to form a continuous body member as herein shown. A plunger having a forward portion extending into the opening and exterior wall surfaces adjacent the interior wall surfaces of the tubular body co-acts with the interior wall surfaces to close off the interior of the tubular body with the plunger in a forward position and the plunger forward portion extending forwardly of the opening, and to open the interior of the tubular body to ambient pressure with the plunger in a rearward position and the plunger forward position entirely within the tubular body.

The plunger exterior wall surfaces and the interior wall surfaces of the tubular body are of a predetermined space relation, one with the other, to inhibit flow of the liquid medium through the opening with the plunger in the rearward position (or open position) and to permit flow of the liquid medium through the opening upon the application of pressure on the enlarged body portion, to raise the internal pressure of the tubular body above the ambient pressure.

To achieve the relative rigid body construction of the dispenser and retain a squeezable portion only at the enlarged body portion, the dispenser may be formed by providing a circular tube of moldable polymeric material having a substantially uniform wall thickness and placing the tube in a mold having a cavity portion for receiving the circular tube in interfitting engagement and an enlarged cavity portion extending outwardly from the wall of the circular tube. By applying pressure to the internal walls of the circular tube, with the tube in plastic flow position, the portion of the tube in the enlarged cavity is expanded into the enlarged cavity to form a bulbous portion of the dispenser having wall thicknesses less than that of the tube uniform wall thickness. Thus, a squeezable enlarged portion is provided on the dispenser having greater flexibility than the remainder of the more rigid dispenser body.

BRIEF DESCRIPTION OF THE DRAWING

The foregoing and other features of the invention will be more particularly described in connection with the preferred embodiment, and with reference to the accompanying drawing, wherein:

FIG. 1 is a front elevational view partially in section showing a dispenser for depositing a liquid correction fluid onto a print medium;

FIG. 2 is a right side elevational view partially in section showing details of the dispenser of FIG. 1;

FIG. 3 is a fragmentary sectional view of a portion of the structure of FIGS. 1 and 2, taken on an enlarged scale for clarity and showing further details of that end of the dispenser which is the forward end when in use;

DESCRIPTION OF THE PREFERRED EMBODIMENT

Figure 4:
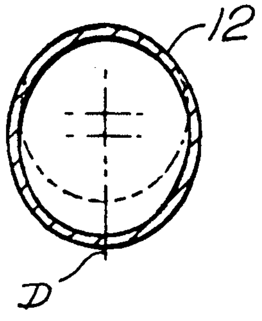
FIG. 4 is an elevational sectional view taken along the lines IV—IV of FIG. 1 showing on an enlarged scale details of the wall structure.
Figure 5:
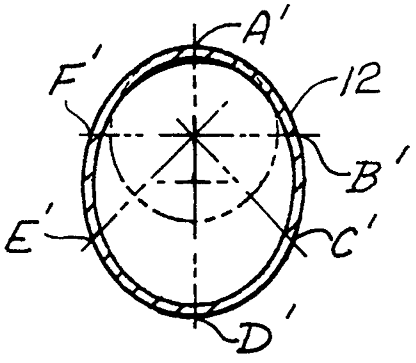
FIG. 5 is an elevational sectional view similar to FIG. 4 but taken along the line V—V of FIG. 1, showing further details of the wall structure.
Figure 6:
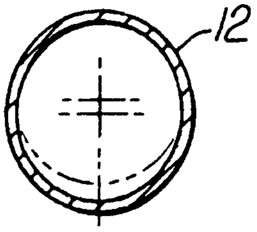
FIG. 6 is an elevational sectional view similar to FIG. 4 and 5, taken along the line VI—VI showing the wall structure at that section.

Referring now to the drawing and in particular to FIGS. 1, 2 and 3, there is shown a dispenser 10 for depositing liquid material onto a print medium. The dispenser 10 generally comprises an elongated tubular body 12 and a cap 14 having a clip 15 suitable for retaining the dispenser 10 in a pocket of the user. The tubular body 12 is formed of wall structure providing a cavity 16 for retaining a correction fluid which may be any of the types well known in the art, and the fluid is retained in the cavity 16 by a valve structure 18 disposed at one end of the body and a sealing means 19 disposed at the opposite end of the body. As best shown in FIG. 3, the valve structure comprises an orifice 20 formed in the forward end of the tubular body and a plunger 22 extending through the orifice and biased into engagement with the interior wall structure adjacent the orifice by virtue of a spring 23 disposed between the rear of the plunger and wall structure of the body 12.

As best shown in FIG. 1, the remaining element in the dispenser 10 comprises a metallic slug 24 which is disposed within the cavity 16 and effective to mix the liquid material disposed within the cavity by shaking the dispenser causing the slug 24 to produce a stirring motion within the cavity 16.

In viewing FIGS. 1 and 2, it should be noted that the elongated tubular body 12 is of substantially circular cross-section at either end but has an enlarged body portion 25 therebetween which is formed of greater cross-section than either end of the tubular body.

Figure 7:
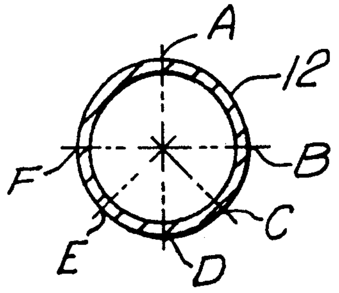
FIG. 7 is an elevational sectional view similar to FIGS. 4, 5 and 6, taken along the line VII—VII showing a typical wall structure of the dispenser which is substantially circular in form.

Referring now to FIG. 1 and 2 taken in conjunction with FIGS. 4 through 7, the sections taken along the length of the tubular body 12 are substantially oval in cross-section as they approach the enlarged portion 25, FIG. 7 showing the substantially circular cross-section which is disposed at either end of the tubular body 12.

It is evident that the enlarged portion 25 facilitates the squeezing of the material from the dispenser by providing a portion of the dispenser 10 which is disposed at the dispenser forward end such that the fingers grip the enlarged portion in a natural and convenient manner during use of the dispenser, in the process of covering undesired printed characters.

Referring to FIGS. 4, 5, 6 and 7, the sections depicted, while shown to be of equal thickness for purposes of illustration, are not so but vary in thickness around the circumference of a section as well as from one section to another. Typically, that portion of the tubular body 12 at either end which is depicted in FIG. 7 is of a maximum thickness while the enlarged portion 25 is of a minimum thickness, the portions on either end supplying stability and rigidity to the dispenser 10 and the enlarged portion providing a section which is easily squeezed by the user to provide pressure to the liquid material within the dispenser.

By way of example, the embodiment shown is manufactured of Nylon 6 material. The tubular body 12 at the rigid section shown in FIG. 7 (typical of the unenlarged tubular body), has a dimension of 0.025 inch at A, 0.029 inch at B 0.0295 inch at C, 0.033 inch at D 0.030 inch at E, and 0.030 inch at F In contrast, the section shown in FIG. 5, taken at the enlarged portion has a thickness of 0.0175 inch at A′, 0.016 inch at B′, 0.016 inch at C′, 0.012 inch at D′, 0.0185 inch at E′, and 0.020 inch at F′. The difference in thickness dimensions between the points B and F or B′ and F′ as well as the differences between the points C and E or C′ and E′ are not of design but reflect the manufacturing tolerance and limitations of measuring techniques of the material, it being understood that the tubular body 12 is substantially symmetrical about the vertical axis shown, throughout its length.

Thus, it can be appreciated that the enlarged portion 25 is provided with thin walls essentially oval in cross-sectional shape, which are more flexible and thereby provide the necessary flexibility to apply pressure to the internal cavity 16 by the user, without sacrificing rigidity of the entire elongated tubular body 12.

It has been found that a suitable variation in wall thickness is obtained by manufacturing the dispenser employing a blow molding process. In the typical example set forth above, a circular tube of a moldable material such as Nylon 6, as described, is provided having uniform wall thickness. The tube is placed in a mold having a cavity portion for receiving the circular tube in interfitting engagement and an enlarged cavity portion extending outwardly from the wall of the circular tube. By applying pressure to the internal walls of the circular tube, with the tube in the plastic flow condition, the walls are expanded into the enlarged cavity forming a bulbous portion or enlarged portion 25, which has a wall thickness less than that of the tube uniform wall thickness, the tube uniform wall thickness forming the more rigid cross-section portion of the elongated tubular body 12 as in FIG. 7.

Figure 8:
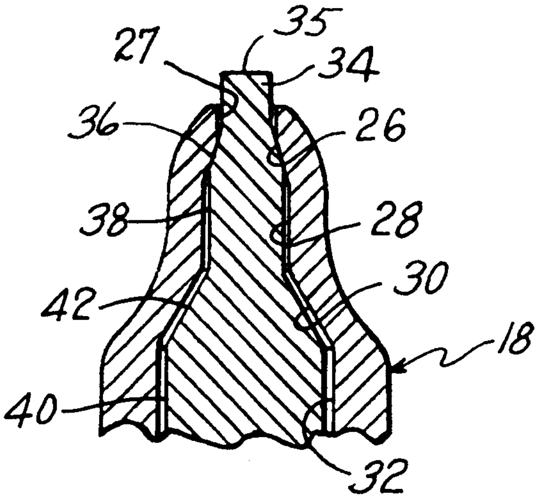
FIG. 8 is a fragmentary sectional view showing the valve portion of the structure of FIG. 3 on an enlarged scale for clarity of detail.
Figure 9:
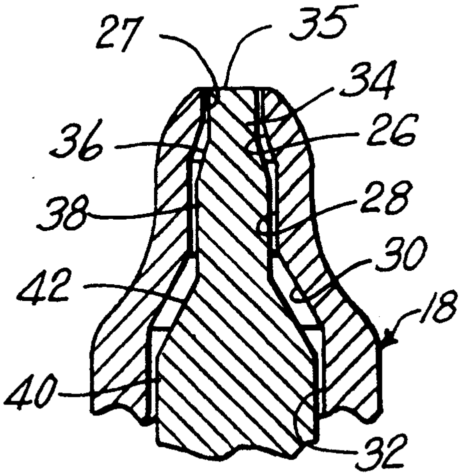
FIG. 9 is a fragmentary sectional view similar to FIG. 8 but showing the valve arrangement in an open position.

Referring now to FIGS. 3, 8 and 9, the valve structure 18 is shown to comprise a plurality of interior wall surfaces of the tubular body 12 which terminate at the orifice 20. The wall surfaces generally comprise a cylindrical surface 27 and a conical surface 26 adjacent the orifice 20, a cylindrical surface 28 extending rearwardly from the surface 26 and an interior conical surface 30 terminating at the interior wall 32 of the tubular body 12.

The plunger 22 is formed of a cylindrical portion 34 extending outwardly from the orifice 20 and terminating in a substantially planar surface 35. The plunger 22 further comprises a conical surface 36 extending rearwardly from the cylindrical portion 34 and a cylindrical surface 38 extending rearwardly into the tubular body 12. The main body portion of the plunger 22 is substantially cylindrical in shape and has a step formed at the rearward end thereof for receiving the spring 23, and produces an exterior cylindrical surface 40 which is connected to the smaller diameter cylindrical surface 38 by a conical surface 42. As best shown in FIG. 8, with the plunger 22 biased forwardly by the spring 23, the conical surface 36 of the plunger engages the forward portion of the conical surface 26, closing off the orifice 20 with the cylindrical portion 34 extending beyond the orifice. In this configuration, the correction fluid contained in the dispenser is substantially prevented from flowing through the orifice 20.

As shown in FIG. 9, when the planar surface 35 contacts a surface of a paper or other material containing printed matter, the plunger 22 is forced against the bias of the spring 23 and the cylindrical portion 34 moves rearwardly into the tubular body 12. The surfaces 36 and 26 are separated, opening the orifice 20 to ambient pressure. As alluded to previously, it is highly desirable to minimize or eliminate the problem of high flow rates caused by naturally occurring internal-external pressure differences, while at the same time allowing the user to deposit a desired amount of fluid without excessive effort. The present valve structure 18 therefore has been designed such that the valve does not allow sufficient flow of correction fluid to make an acceptable correction, without increasing the internal pressure by squeezing the enlarged portion 25 of the dispenser 10. In order to accomplish this, the valve structure 18 is provided with a clearance between the cylindrical surfaces 28 and 38 and between the cylindrical surface 27 and the outer surface of the cylindrical portion 34, in combination with a length of flow path between the surfaces 28 and 38 and the surface 27 and that of the portion 34 which does not permit the flow of an objectionable, or sufficient amount of fluid employed in the dispenser when the orifice 20 is open as shown in FIG. 9. That is to say, the designed restriction between the cylindrical surfaces 28 and 38 and surface 27 and portion 34 is sufficient to require squeezing of the dispenser 10 for fluid flow over the range of reasonably expected use temperatures and the resultant change in internal pressure. By maintaining the two cross-sectional areas, that is the opening between the surfaces 28 and 38 and the opening between the surface 27 and the portion 34 as throttling areas, the design may be changed to accommodate a wide range of specific gravity of commercial fluids by an increase or decrease in the designed restriction between the cylindrical surfaces 28 and 38 and the surface 27 and cylindrical portion 34 and/or an increase in the length of the cylindrical portions of the plunger 22 and corresponding portions of the valve wall structure.

In operation, when it is desired to correct a portion of printed matter, the cap 14 is removed from the dispenser 10 and the dispenser is located over the portion on which the correction is to be made. The elongated tubular body is then pressed downwardly such that the planar surface 35 contacts the area to be corrected, and is forced inwardly opening the orifice 20 at which point the correction fluid does not escape from the orifice but is maintained within the cavity 16 of the dispenser 10. The user, by squeezing the enlarged portion 25 of the elongated tubular body 12, causes an increase in pressure within the cavity 16 above the ambient pressure and liquid material flows through the orifice 20 in a controlled manner.

While it is apparent that modifications and changes may be made within the spirit and scope of the present invention, it is our intention, however, only to be limited by the scope of the appended claims.

As our invention, we claim.

1. A method of manufacturing a dispenser having wall structure for containing and depositing a liquid material onto a print medium which includes the steps of:

forming a circular tube of moldable polymeric material having a substantially uniform wall thickness;

placing the tube in a mold having an internal wall structure forming a cavity having a portion for receiving the circular tube in interfitting engagement and an enlarged cavity portion extending outwardly from the centerline of the circular tube to a maximum cross-section diameter adjacent one end of the cavity and tapering towards either end of the cavity portion to form a plurality of cross-sectional areas of lesser dimension than the maximum dimension with one longitudinal wall segment remaining parallel to the centerline of the circular tube over its length;

applying pressure to the internal wall of the circular tube with said tube in the plastic flow condition to expand the tube wall into the enlarged cavity forming a bulbous portion of said dispenser, the tube uniform wall thickness and the maximum cross-sectional dimension being chosen to form a wall thickness at the mold enlarged cavity portion less than that of said tube uniform wall thickness to provide a squeezable enlarged portion on said dispenser of greater flexibility than the remainder of the dispenser body and to main a substantially rigid wall structure throughout the remaining length of the dispenser.

2. A method as set forth in claim 1 wherein said uniform wall thickness is substantially in the range of 25 thousandths to 33 thousandths of an inch.

3. A method as set forth in claim 1 wherein the tube wall thickness at the enlarged cavity portion is in the area of 12 thousandths to 20 thousandths of an inch.

* * * * *